United States Patent [19]

Takemura

[11] Patent Number: 4,513,312

[45] Date of Patent: Apr. 23, 1985

[54] SOLID-STATE COLOR TELEVISION CAMERA

[75] Inventor: Yasuo Takemura, Tokyo, Japan

[73] Assignee: Tokyo Shibaura Denki Kabushiki Kaisha, Kawasaki, Japan

[21] Appl. No.: 429,011

[22] Filed: Sep. 30, 1982

[30] Foreign Application Priority Data

Sep. 30, 1981 [JP] Japan .................................. 56-153564
Aug. 13, 1982 [JP] Japan .................................. 57-139755

[51] Int. Cl.³ .............................................. H04N 9/07
[52] U.S. Cl. ................................................ 358/44
[58] Field of Search ........................................ 358/44

[56] References Cited

U.S. PATENT DOCUMENTS

| | | | |
|---|---|---|---|
| 3,882,535 | 5/1975 | Takemura | 358/44 |
| 4,121,244 | 10/1978 | Nakabe . | |
| 4,246,600 | 1/1981 | Nakagawa . | |
| 4,434,435 | 2/1984 | Fujimoto | 358/44 |

FOREIGN PATENT DOCUMENTS

| | | |
|---|---|---|
| 1501017 | 2/1978 | United Kingdom . |
| 1511526 | 5/1978 | United Kingdom . |
| 2014397 | 8/1979 | United Kingdom . |
| 2033189 | 5/1980 | United Kingdom . |

OTHER PUBLICATIONS

"Frequency Interleaving Color TV Pickup System", Yasuo Takemura, IEEE Trans. Broadcasting, BC–21, 3 (Sep. 1975).

*Primary Examiner*—Richard Murray
*Attorney, Agent, or Firm*—Oblon, Fisher, Spivak, McClelland & Maier

[57] ABSTRACT

An incident light image is projected onto a CCD device through a color filter array. The color filter array is provided with a color filter row (n') with the same construction as that of a color filter row (n) corresponding to an nth horizontal scanning for interlacing purposes, which is disposed between the color filter row (n) and a (n+1)th color filter row corresponding to a (n+1)th horizontal scanning. The color filter blocks forming the color filter rows (n) and (n+1) are disposed and shifted by the half of a length (L) of each block extending in the horizontal scanning direction. All of the color filter rows forming the color filter array each have an arrangement of color filter blocks with two different color transmission characteristics alternately arranged.

10 Claims, 42 Drawing Figures

FIG. 1

| R | G | R | G |
|---|---|---|---|
| R | G | R | G |
| G | B | G | B |
| G | B | G | B |
| R | G | R | G |
| R | G | R | G |

FIG. 2

| G | R | G | B | G | R |
|---|---|---|---|---|---|
| G | R | G | B | G | R |
| B | G | R | G | B | G |
| B | G | R | G | B | G |
| G | R | G | B | G | R |
| G | R | G | B | G | R |

FIG. 4

|  | ←L→ | | | | | |
|---|---|---|---|---|---|---|
| (n) | W | G | W | G | W | ~32a |
| (n') | W | G | W | G | W | ~32b |
| (n+1) | Ye | Cy | Ye | Cy | Ye | ~32c |
| (n'+1) | Ye | Cy | Ye | Cy | Ye | ~32d |
| (n+2) | G | W | G | W | G | ~32e |
| (n'+2) | G | W | G | W | G | ~32f |
| (n+3) | Cy | Ye | Cy | Ye | Cy | ~32g |
| (n'+3) | Cy | Ye | Cy | Ye | Cy | ~32h |

32

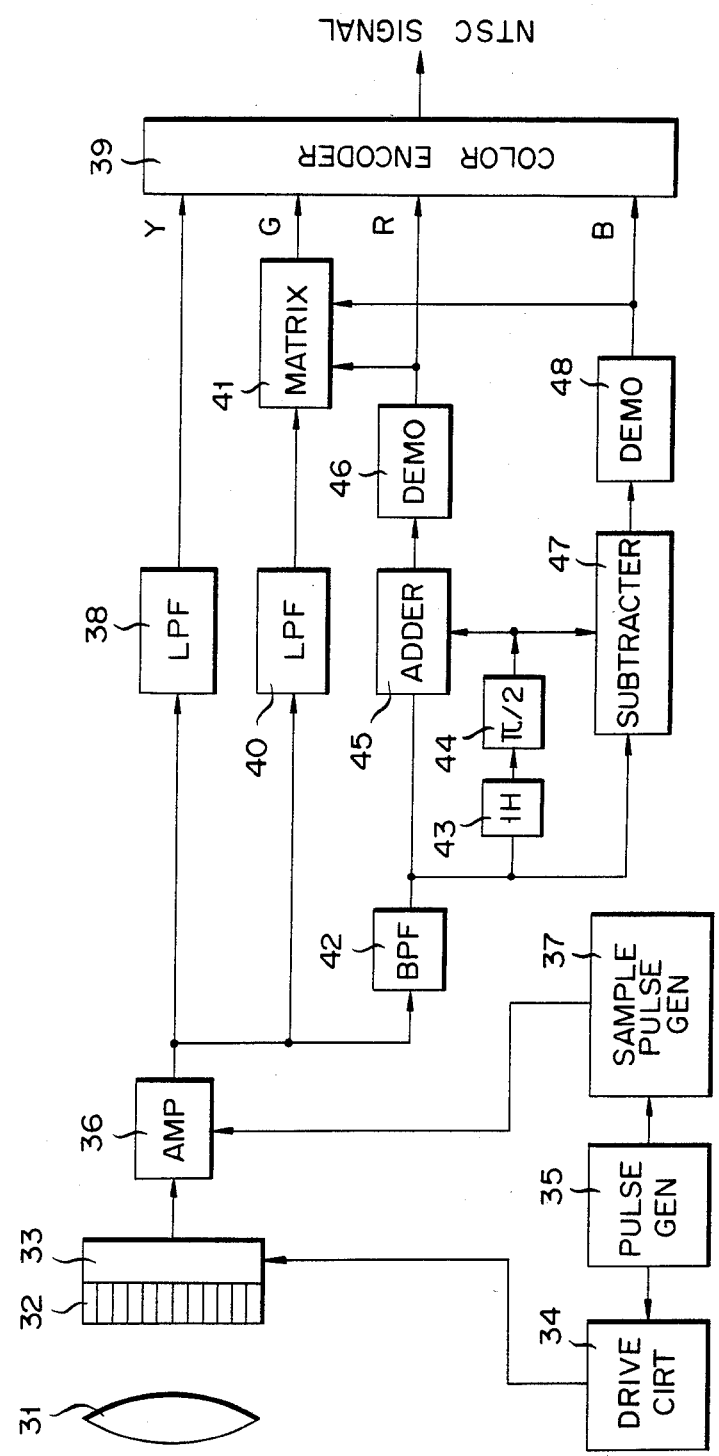
F I G. 3

FIG. 5
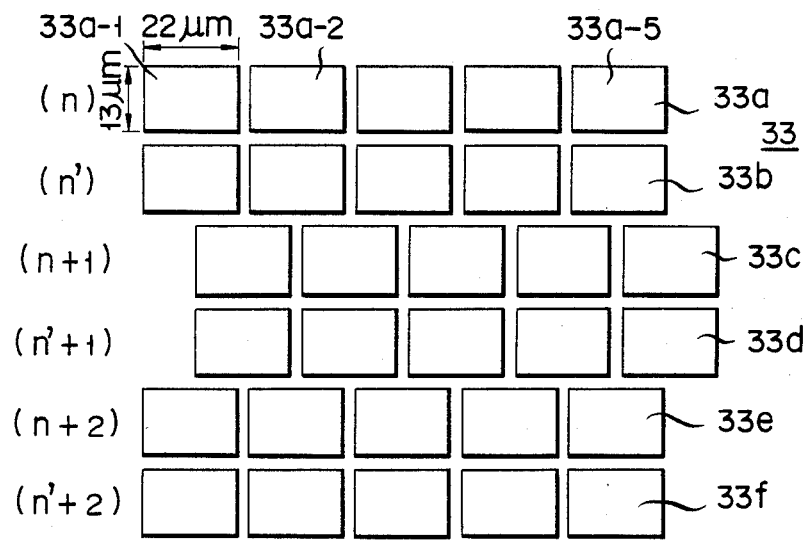
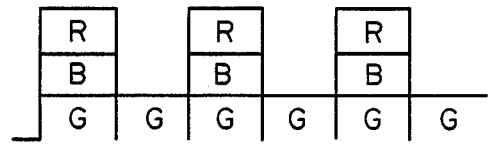
FIG. 6A
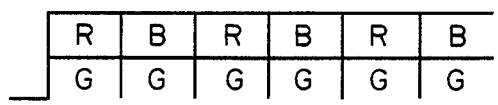
FIG. 6B
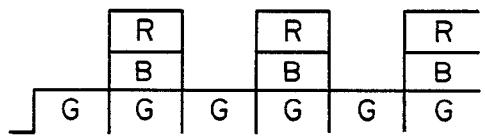
FIG. 6C
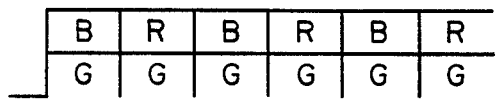
FIG. 6D F I G. 7A 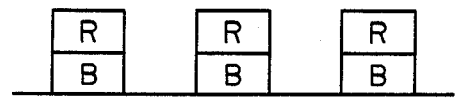
F I G. 7B 
F I G. 7C 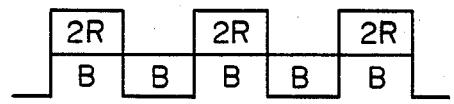
F I G. 7D 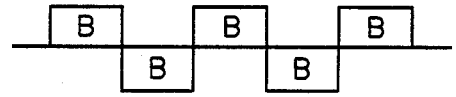
F I G. 8A 
F I G. 8B 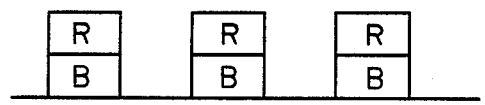
F I G. 8C 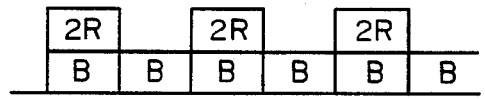
F I G. 8D 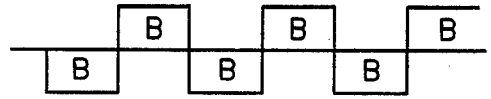

FIG. 11A

| | 32A | | | |
|---|---|---|---|---|
| W | G | W | G | W |
| W | G | W | G | W |
| Cy | Ye | Cy | Ye | |
| Cy | Ye | Cy | Ye | |
| G | W | G | W | G |
| G | W | G | W | G |
| Ye | Cy | Ye | Cy | |
| Ye | Cy | Ye | Cy | |

FIG. 11B

| | 32B | | | |
|---|---|---|---|---|
| W | R | W | R | W |
| W | R | W | R | W |
| M | Ye | M | Ye | |
| M | Ye | M | Ye | |
| R | W | R | W | R |
| R | W | R | W | R |
| Ye | M | Ye | M | |
| Ye | M | Ye | M | |

FIG. 11C

| | 32C | | | |
|---|---|---|---|---|
| W | B | W | B | W |
| W | B | W | B | W |
| M | Cy | M | Cy | |
| M | Cy | M | Cy | |
| B | W | B | W | B |
| B | W | B | W | B |
| Cy | M | Cy | M | |
| Cy | M | Cy | M | |

| Ye | Cy | Ye | Cy |
| Ye | W | Ye | W |
| G | W | G | W |
| Ye | W | Ye | W |
| Ye | Cy | Ye | Cy |
| Ye | W | Ye | W |

| W | Cy | W | Cy |
| Ye | we | Ye | W |
| Cy | W | Cy | W |
| Ye | W | Ye | W |
| W | Cy | W | Cy |
| Ye | W | Ye | W |

| W | Ye | W | Ye |
| Cy | W | Cy |
| Ye | W | Ye |
| W | Cy | W | Cy |
| Ye | W | Ye | W |

52C

SOLID-STATE COLOR TELEVISION CAMERA

BACKGROUND OF THE INVENTION

The present invention relates to a color television camera using a solid-state image pickup device and a color filter array.

Color television cameras using solid-state image pickup devices such as CCD, CID and MOS have been actively developed in recent years. Particularly, a so-called single chip type color television camera has attracted noticeable attention in this field. In this type of color television camera, color filters are arranged corresponding to the number of picture elements. An optical image modulated by the color filter is applied to the solid-state image pickup device. Then, the image pickup device separates the image into three primary colors.

The prior art employ a number of color filters of three colors, i.e. red, blue, and green, which are arranged as shown in FIGS. 1 and 2. FIGS. 1 and 2 show patterns or arrangements of color filters in the color filter arrays as matrix arrays of the color filters. In the pattern shown in FIG. 1, pairs of green filters are arranged in a mosaic fashion in the vertical scanning direction. The remaining spaces of the matrix color filter array are alternately filled with pairs of the red and blue filters every two rows. In the filter pattern of FIG. 2, pairs of the green filters are arranged in a mosaic fashion, like the filter pattern shown in FIG. 1. The remaining spaces in the matrix array are filled with pairs of the red and blue filters in every column, as shown. In both the filter arrays, two of the same color filters are continuously arranged in successive order, as shown. The reason for this is that the color filter array is designed for an interlaced scanning system. In these examples, signals are taken out every two rows in one field scanning. The green color signal provides a major part of a luminance signal. Therefore, it is desired to use as large a number of green color signals. Drop-out of the green signals occurring in one line scanning is compensated for by scanning two lines, with an increase in the number green signals used. For obtaining a more complete signal, even four lines of scannings are required. On this basis, the prior art color filter arrays as shown can provide an unsatisfactory resolution in the vertical scanning direction.

Red and blue color signals are produced in a line-sequential order. The line sequential color signals must be converted into concurrent signals. To this end, these color signals must be delayed one horizontal scanning period, using a so-called 1H delay line. When the color of an object under image pickup abruptly changes from one color to another in the vertical scanning direction, because of the delay of one horizontal scanning period, the colors before and after the color is changed occasionally overlap becoming a concurrent signal which is a false signal. The presence of the false signal markedly impairs the picture quality of the reproduced picture.

For separating three primary colors from the color signals, multiplex color signals from the solid state image pickup device must be gated at specific phases thereof. When a signal transmission path has a narrow frequency band, a switching circuit associated with the gates must be operated in a high frequency mode. Such a switching circuit is complicated and needs large power consumption. Reliable color separation is also difficult. Occasionally, color fidelity deteriorates in the reproduced picture.

The problems as mentioned above are common to both the prior color filter arrays shown in FIGS. 1 and 2. Particularly, the color filter array of FIG. 2 has the following disadvantages. The color filter patterns of the color filter array of FIG. 2 provide red and blue color signals every four color filter rows. The frequency of the carrier wave is therefore lower than that of the color filter pattern of FIG. 1. This indicates that the frequencies of the red and blue signals fall within the frequency band of the luminance signal. The likelihood is that stripe noise possibly appears in the reproduced picture. For example, if the color of the object under image pickup is red over its entire surface, excessive charges are produced in the picture elements of the solid-state image pickup device, which correspond to the red color filters. The excessive charges produced overflow into the picture elements corresponding to the green color filters adjacent to the red filters. The result is that the camera operates as if the green color signals are produced. Actually, a periodical shade appears in the reproduced picture, because the green color signals make the greatest contribution to the formation of the luminance signal. The red color signals appear in the form of shaded stripes in the reproduced picture. For improving resolution, high frequencies are usually emphasized. In such a case, even if the above deleterious phenomena could be eased by some measure, a slight amount of color mixing is still a problem. This fact prohibits the emphasis of high frequencies a clear picture cannot be produced.

The prior art color filter arrays also involve problems in the manufacturing process. In manufacturing the prior art color filter arrays, the color filters are colored with three primary colors in successive order. This process requires a number of steps to manufacture. This leads to an increase in the manufacturing cost. Further, dirt tends to stick to the filters under manufacture. Thus, the prior color filter arrays suffer from a high rate of defective products, or a poor production yield, and thus increased manufacturing costs.

SUMMARY OF THE INVENTION

Accordingly, an object of the present invention is to provide a solid-state color television camera which has improved horizontal and vertical resolution to provide a noise-free clear picture, and which can simply and reliably separate colors from the color signals and can manufacture color filters in a simple manner to provide high production yield and to reduce the manufacturing cost.

According to the present invention, there is provided a solid-state color television camera comprising: a solid-state image pickup device; a color filter array placed in front of the solid-state image pickup device; a color separation circuit for extracting three primary colors, red, green and blue, from a multiplex color signal derived from the image pickup device; the filter array including a plurality of color filter rows (32a to 32h, 52a to 52f) extending in the horizontal scanning direction, each of the color filter rows having color filter blocks with different color transmission characteristics alternately arranged in progress order, in which a first color filter row selected from the plurality of color filter rows (32a, 52a) is made up of first and second color filter blocks with first and second color transmission characteristics, the first color filter row is disposed adjacent to a second color filter row (32c, 52b) made up of and alternately arranged third and fourth filter blocks respectively having a third color transmission characteristic and a given transmission characteristic, and the first and second color filter blocks of the first color filter row are disposed and shifted a given length in the horizontal scanning direction, with respect to the third and fourth color filter blocks of the second color filter row; the solid-state image pickup device (33, 51) having a plurality of photosensors arranged corresponding to an arrangement the color filter blocks of the color filter array.

BRIEF DESCRIPTION OF THE DRAWINGS

FIGS. 1 and 2 show arrangements of red, green and blue color filter blocks used in a prior color television camera;

FIG. 3 shows a block diagram of an embodiment of a color television camera according to the present invention;

FIG. 4 shows an arrangement of a color filter array used in the camera of FIG. 3;

FIG. 5 shows an arrangement of photosensors of a CCD device used in the camera of FIG. 3;

FIGS. 6A to 8D are schematic illustrations of multiplex color signals for explaining the operation of a third embodiment of FIG. 3;

FIGS. 11A to 12 illustrate other color filter arrays used in the camera according to the present invention;

FIGS. 18A to 20D show explanatory diagrams illustrating the operation of the embodiment shown in FIG. 15; and FIGS. 21 to 23 show other color filter arrays used in the camera according to the present invention.

DETAILED DESCRIPTION OF THE PREFERRED EMBODIMENTS

Figure 9:
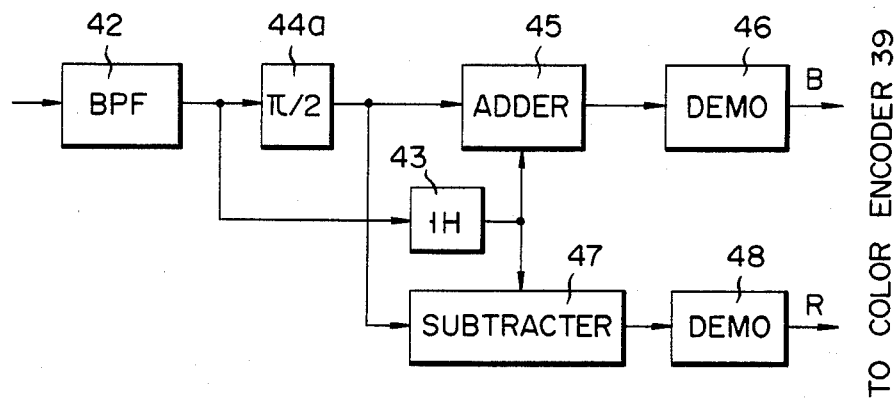
FIG. 9 is a block diagram illustrating another embodiment of a color separation circuit used in the color television camera.

Referring now to FIG. 3, there is shown an overall arrangement of a solid-state color television camera according to the present invention. An incident image light passed through a lens system 31 is projected onto a color filter array 32. The incident image light further travels through the filter array 32 to form an image on a CCD image pickup device 33.

The color filter array 32 has an arrangement as shown in FIG. 4. In FIG. 4, a color filter row n includes transparent filter blocks W and green filter blocks G allowing transmission of green light, which are alternately arranged in the direction of the horizontal scanning. Each of the color filter blocks W and G are rectangular in shape 13 $\mu$m × 22 $\mu$m, for example. Another color filter row n' has exactly the same arrangement as that of the color filter row n. As shown, the transparent filter blocks W and the green filter blocks G in the color filter row n are exactly aligned with the corresponding ones of the color filter row n', as viewed in the direction of the vertical scanning.

A further color filter row (n+1) is provided contiguous to the color filter row n' as viewed in the vertical scanning direction. The filter array (n+1) includes yellow filter blocks Ye and cyan filter blocks Cy, which are alternately arranged in the horizontal scanning direction. The color filter arrays n' and (n+1) are horizontally shifted in the following. The leading edge of each yellow filter block Ye is positioned exactly at a mid point in a length L of the block W in the filter array n', which extends in the horizontal scanning direction. Accordingly, the trailing edge of the filter block Ye is exactly at the mid point in the length L of the green filter block G adjacent to the filter block W. An additional color filter row (n'+1) is disposed beneath the color filter row (n+1) as viewed in the drawing. Also in this case, the filter blocks Ye and Cy in both the filter rows are precisely aligned with one another in the vertical scanning direction.

Further, a color filter row (n+2) with the same arrangement as that of each of the filter rows n and n' lies beneath the color filter row (n'+1). The only difference between these filter rows is a relative positioning of the filter row (n+1) to the filter row (n'+1) thereon. The leading edge of the yellow filter block Ye in the filter row (n'+1) is at the mid point of a length L of the green filter block G in the filter row (n+2). The trailing edge of the same is positioned at the mid point of the length L of the transparent filter block W. A color filter row (n'+2) with the same arrangement as that of the filter row (n+2) is additionally provided adjacent to the latter filter (n+2) as viewed in the vertical scanning direction. A color filter array (n'+2) with the same arrangement as that of the filter array (n+2) is provided underlying the filter array (n+2), as shown.

Similarly, the color filter row (n'+1) is accompanied by a color filter row (n+3) with the same arrangement as that of each of the filter arrays (n+1) and (n'+1) placed therebeneath. The color filter row (n+3) also lies on another filter row (n'+3). The relative positioning of the filter array (n'+2) to the filter array (n+3) is the same as that of the filter arrays n' and (n+1).

There, 492 color filter rows arranged from top to bottom in the drawing in the order shown in FIG. 4. Each color filter array has 380 color filter blocks, for example. For effecting the interlaced scanning in the color filter array thus arranged, the filter arrays n, (n+1), (n+3), . . . , are first scanned in this order from top to bottom to form a first field. Then, the filter rows n', (n'+1), (n'+2), (n'+3), . . . are scanned in progressive order to form a second field. In this way, the first and second fields of scanning are interlaced in a successive manner. This operation will be described later.

FIG. 5 illustrates an arrangement of photosensors, i.e. picture elements formed on a CCD device 33. As shown, the photosensors are arranged corresponding to the color filter blocks of the color filter array 32. More specifically, the first photosensor 33a-1 corresponds to the first filter block W in the filter row n, and the second photosensor 33a-2 to the second green filter block G. This indicates that the light passed through the filter block W is incident on the photosensor 33a-1. The photosensors 33a-1 to 33a-2, . . . are spaced with given gaps for ensuring an insulation therebetween. The area of the photosensor may be similar to that of the filter block, and is 13 $\mu$m × 22 $\mu$m, for example. An area of the entire photosensitive surface of the CCD 33 is, for example, 6.6×8.8 mm. A total number of the photosensors, i.e. picture elements, is 492×380.

An image of an object under image pickup, which is formed on the photosensitive surface of the CCD device through the color filter array 32, has been modulated by the color filter blocks W, G, Ye and Cy. A color signal derived from the CCD device 33 for forming a standard television signal on the basis of the modulated color signal has been obtained through the interlaced scanning. Specifically, the signals produced by the first field scanning are obtained from the odd-numbered picture element rows 33a, 33c, and 33e. In the second field scanning, the even-numbered picture element rows 33b, 33d, 33f, which are skipped in the first field scanning, are scanned to produce signals. In this way, two field scannings of the interlaced picture element rows provide color signals perfectly representing the object image formed on the photosensitive surface.

The color signal obtained through the interlaced scanning is a multiplex color signal formed by multiplexing a red color signal R, a blue color signal B and a green color signal G. The multiplexing of the color signals results from the nature of these filters. The transparent filter W permits all of the red, green and blue colors to transmit therethrough. The yellow filter Ye is transparent to red and green, and the cyan filter Cy to the blue and green colors. The multiplex color signal as illustrated in FIG. 6 corresponds to an arrangement of picture elements shown in FIG. 5. FIG. 6A schematically illustrates a multiplex color signal produced from the picture element row 33a having the transparent filters W and the green filters G alternately arranged in the horizontal scanning direction. FIG. 6B schematically shows a multiplex color signal produced from the picture element row 33c having the yellow filter Ye and the cyan filter Cy alternately arranged. As shown in FIG. 6A, the multiplex color signal from the picture element row 33a is a combination of multiplex color signals R+G+B and green signals G which are alternately arranged. The color signal from the picture element row 33c is a combination of multiplex color signals R+G and B+G which are alternately arranged. The signals from the picture element rows 33a and 33b are phase-shifted by $\pi/2$ with a picture element period of $2\pi$. The signals shown in FIGS. 6C and 6D are produced at every horizontal scanning through one field scanning following the signals shown in FIGS. 6A and 6B. The signals of FIGS. 6C and 6D are also phase-shifted $\pi/2$ each other. All of these signals shown in FIGS. 6A to 6D are pulse amplitude modulated signals with a carrier wave at 3.58 MHz. The signal shown in FIG. 6A includes a nonmodulated signal R/2+G+B/2, an amplitude modulated signal with an amplitude R/2+B/2 carried by a carrier wave of 3.58 MHz and its higher harmonics signals. The signal shown in FIG. 6B includes a nonmodulated signal of R/2+G+B/2, an amplitude modulated signal with an amplitude R/2 carried by the carrier wave of 3.58 MHz, an amplitude modulated signal with an amplitude B/2 carried by the same carrier wave and its higher harmonic signal. The amplitude modulated signals of R/2 are successively delayed by $\pi/2$ from the signal of FIG. 6A to the signal of FIG. 6D. Conversely, the modulated signals B/2 are advanced by $\pi/2$ ($=\pi-\pi/2$). The signals shown in FIGS. 6C and 6D contain the signals advanced by $\pi$ from the signals of FIGS. 6A and 6B.

The multiplex color signal can be separated on the basis of the frequency bands of the signals as mentioned above. Returning to FIG. 3, the CCD device 33 is driven by a pulse signal applied from a drive circuit 34 to produce a multiplex color signal. The drive circuit 34 is coupled with a pulse generator 35 in a synchronous operation manner. The multiplex signal produced from the CCD device 33 is applied to an amplifier 36 where it is amplified up to a desired level of the signal. The amplifier 36 may be so designed as to have a so-called sample and hold function that it is gated by the output pulse from a sample pulse generator to allow the multiplex color signal to pass therethrough and amplify the multiplex signal. The pulse generated by the sample pulse generator is formed by frequency dividing the pulse from the pulse generator 35.

The multiplex color signal amplified by the amplifier 36 is supplied to a first low pass filter (LPF) with a 3 MHz frequency band for removing the modulated component partially forming the multiplex color signal. The output signal from the LPF 38 becomes a luminance signal Y of R/2+G+B/2 with no modulated component, and then is applied to a color encoder 39.

The output signal from the amplifier 36 is also applied to a second LPF 40 with a 0.5 MHz frequency band. The output signal passed through the LPF 40 is a low frequency color signal. The output signal from the LPF 40 is applied to a matrix circuit 41, together with a red color signal R and a blue color signal B separated from the multiplex signal by a signal processing to be described later. The matrix circuit 41 receives and arithmetically processes the three signals to produce a green color signal G which in turn is applied to a color encoder 39.

The output signal from the amplifier 36 is also applied to a band pass filter BPF 42 with a frequency band of approximately 1.2 MHz centered at 3.58 MHz. The modulated component in the multiplex signal can be obtained by passing the output signal through the BPF 42. Accordingly, the output signal from the BPF 42 is a R+B signal when it is supplied with the signal shown in FIG. 6A. It contains an R signal retarded $\pi/2$ from the R+B signal and a B signal advanced $\pi/2$ from the same signal.

The output signal from the BPF 42 is applied to a 1H delay circuit 43 for delaying one horizontal scanning period. The output signal from the 1H delay circuit 43 is further applied to a $\pi/2$ delay circuit 44 for correcting the $\pi/2$ phase shift. The phase adjustment by these circuits phase-aligns the R+B signal with the R and B signals as the modulated component extracted through the BPF 42, as shown in FIGS. 7A and 7B. Both the signals are applied to an adder circuit 45. The output signal from the adder circuit 45 takes a signal form containing 2R+B signals and the B signals alternately arranged, as shown in FIG. 7C. The output signal from the adder circuit 45 is applied to a first demodulator circuit 46 with a high pass filter (HPF) function where the red color signal R is separated from the signal applied thereto. The signals shown in FIGS. 7A and 7B are applied to a subtractor circuit 47 where these are subtracted one signal from another. The output signal from the subtractor takes a signal form in which the B signals alternately change the polarities, as shown in FIG. 7D. The output signal from the subtractor 47 is applied to a second demodulator circuit 48 with a BPF function to have the blue signal B separated. The separated red and blue signals R and B, together with the luminance signal Y and the green signal G, are applied to a color encoder 39. In turn, the color encoder 39 forms an NTSC signal as a standard television signal.

The phase relationships of a signal formed by passing the signal shown in FIG. 6C through the 1H delay circuit 43 and the $\pi/2$ delay circuit 44 with the signal shown in FIG. 6D are illustrated in FIGS. 8A and 8B. In this case, the output signal from the adder circuit 45 includes 2R+B signals and B signals which are alternately arranged in the horizontal scanning direction, as shown in FIG. 8C, like the signal form in FIG. 7C. The output signal from the adder circuit 45 includes the B signals alternately changing the polarities, as shown in FIG. 8D. These output signals are subjected to the color separation processing, as in the above case. In the above description, three primary colors of R, G and B were used for the signals applied to the color encoder 39. The primary colors may be substituted by the color difference signals or another form of signals, if necessary.

The embodiment of a solid-state color television camera according to the present invention, which has been described, has the following advantages.

In the color filter array 32 shown in FIG. 4, four colors W, G, Ye and Cy are used. The color W is made up of R+G+B and obtained through a transparent portion with no color filter. The color G is formed at the portion where the colors Ye and Cy are superposed. This fact indicates that only two steps are needed for manufacturing the color filter array 32. On the other hand, the prior color filter array uses the three primary colors R, G, and B, as shown in FIGS. 1 and 2. This fact needs three steps or more for the coloring the filters. This long coloring process allows dirt and grime to easily stick to or to impair the filter. This leads to poor production in yield of the filters and increased manufacturing cost. On the other hand, the manufacturing process of the color filter array 32 according to the present invention required remarkably fewer steps for manufacturing as mentioned above. This gives us a remarkable ease of manufacturing of the color filters.

A further notable feature is provision of a clear color picture with less impairment of the vertical resolution, because the luminance signal Y can be obtained by a single scanning line signal. In the prior art, the G signals are used for a luminance signal, as shown in FIGS. 1 and 2. The drop out of the green signals are compensated for by using the signals of other scanning lines. This impairs the vertical resolution. In the present invention, such a defect is successfully remedied and requires no 1H delay line with a broad band used for the compensation.

Additionally, a frequency of the carrier wave of the color signal is 3.58 MHz and lies outside the frequency band of the luminance signal Y. This protects the camera from the adverse influence of pulsate noise from peripheral electronic circuits, resulting in no impairment of the horizontal resolution. Even if a slight amount of color mixing occurs among the picture elements of the CCD device, no stripe noise is produced, thus providing a noise-free and clear picture. Moreover, a satisfactory emphasis of the high frequencies of the picture signal is allowed with the result that the horizontal resolution can be improved and a clearer picture is obtained.

Since the color signals are all obtained using two scanning lines, a sampling frequency in the vertical scanning direction is high. Therefore, interference by a false signal in the vertical scanning direction is remarkably reduced compared with the case using the color filter shown in FIG. 1.

The color separation circuit for the color filter array of the present invention can simply and reliably be arranged as shown in FIG. 3. This feature always provides a stable color picture with good color tone.

The color separation, as a whole, is performed in the frequency band of approximately 4 MHz. This feature eliminates the need for a specially designed high frequency circuit and makes the color tone insusceptible to a slight amount of color mixing of the color signals. Further, no especially high power is needed, allowing the whole camera to be operable with low power.

The filter blocks are physically shifted $\pi/2$ every scanning line in the horizontal scanning direction, as shown in FIGS. 4 and 5. With this shift, even a CCD device with a relatively small number of picture elements, provides a clear picture with a high horizontal direction and less beat interference.

As shown in FIGS. 6A to 6D, the red signals as first color signals are shifted by $\pi/2$ every scanning line in successive order. On the other hand, the blue signals as second color signals are advanced by $\pi/2$ phase every scanning line. Thus, a frequency interleave is formed. Accordingly, when the object is picked up and the picked up signal contains the same frequency, these are not coincident with each other on every scanning line, thus reducing the beat interference.

Figure 10A:
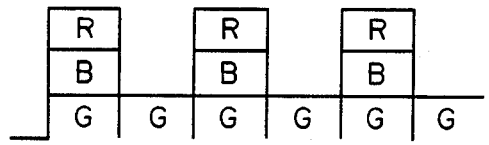
FIGS. 10A to 10D are schematic illustrations of multiplex color signals for explaining the operation of the circuit shown in FIG. 9.
Figure 10B:
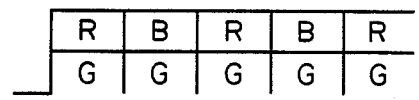
Figure 10C:
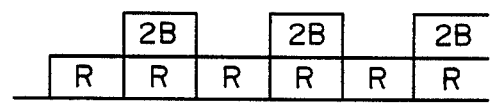
Figure 10D:
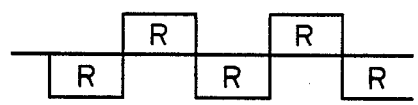

While the circuit arrangement of FIG. 3 has been used for the separation of the color signals R and B in the above-mentioned embodiment, a circuit arrangement as shown in FIG. 9 may also effect such a color separation. Part of the output signal from the BPF 42 is applied to a $\pi/2$ delay circuit 44a for delaying $\pi/2$ and a 1H delay circuit 43. The output signal from the $\pi/2$ delay circuit 44a is applied to an adder circuit 45 and a subtraction circuit 47. The output signal from the $\pi/2$ delay circuit 44a is a high frequency signal with a waveform as shown in FIG. 10B. The output signal from the $\pi/2$ delay circuit 44a is also a high frequency signal with a waveform as shown in FIG. 10B. The output signal from the adder circuit 45 contains the signals R and the signals 2B+R alternately arranged in the horizontal direction, as shown in FIG. 10C. The output signal from the subtraction circuit 47 is a red color modulated signal as shown in FIG. 10D. Therefore, the first and second democulator circuits 46 and 48 produce the B and R color signals, respectively.

The requirement for color separation that the adjacent scanning lines must be shifted by $\pi/2$, may be attained by passing the color signal through two delay circuits with delay times $\pi/2 - \alpha$ and $1H \pm \alpha$.

The arrangement of the color filter array 32 shown in FIG. 4 may be modified into an arrangement of the filter array in which color filter blocks in the first and second filter rows are arranged W, G, W, G, ... in successive order, and the color filter blocks in the third and fourth rows are arranged Cy, Ye, Cy, Ye, ... in this order. With use of the color filter array 32A, the demodulator circuit 46 in the circuit arrangement shown in FIG. 3 produces a blue signal and the demodulator 48 produces a red signal. The present color filter array 32A can also attain effects comparable with those by the filter array 32. In another color filter array 32B as shown in FIG. 11B, for example, the color filter blocks in the first and second color filter rows are horizontally arranged in a train of color filter blocks W and R; the color blocks in the third and fourth color filter rows are arranged in a train of M (magenta, or blue+red) and Ye alternately arranged in the horizontal direction. When this color filter array 32B is used, the demodulator circuit 46 produces a blue signal and the demodulator circuit 48 produces a green signal. Yet another color filter array 32C is shown in FIG. 11C. In the color filter array 32C, the first and second color filter rows each include the color filter blocks W and B alternately arranged in a line. The third and fourth color filter rows include the color filter blocks M and Cy alternately arranged in a line. With use of this filter array, the demodulator circuit 46 provides a red signal and the demodulator circuit 48 provides a green signal. In these cases, one remaining color signal of these three primary color signals is of course obtained from the matrix circuit 41.

Figure 12:
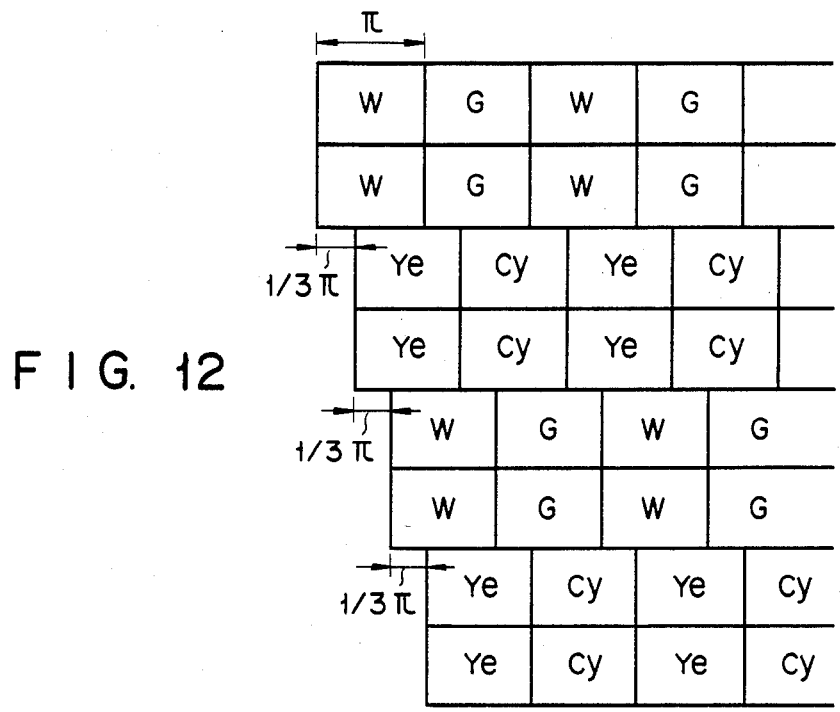

While in the above-mentioned embodiments the filter blocks in one filter row are physically shifted $\pi/2$ from those in another adjacent filter row, as shown in FIG. 4, $\pi/3$ of this physical shift as shown in FIG. 12 is allowed within the spirit of the present invention. In this instance, the modulated signal of the red signal advances the phase $\pi/3$ every horizontal scanning line in successive order. Conversely, the modulated signal of the blue signal successively retards $2\pi/3$ with every scanning lines. Both the modulated signals of red and blue are phase-shifted by $\pi$ between the adjacent scanning lines. At this time, these signals are added together or subtracted one signal from another using a delay line with a delay of $1H+\pi/3$, thereby separating two color signals of red and blue from the modulated color signals.

In an extension of this method, a phase shift $\pi$ of the picture elements every scanning line is all that is needed. In this case, both the modulated color signals are subject to addition or subtraction using a delay line with a delay of $(1H+\pi)$, allowing separation of two color signals from the modulated signals.

The BPF 42 used in the above-mentioned embodiments may be substituted by an HPF (high-pass filter), if necessary. The solid-state image pickup device used may be MOS, CID, etc. in addition to the CCD in the above-mentioned instances. The successive scanning method may be used in place of the interlaced scanning method. In this case, the array of the picture elements or the color filter blocks of the solid-state image pick-up device 33 is of course modified into an array where rows of the picture elements or the filter blocks are alternately arranged one filter block upon or beneath another, as shown in FIGS. 13 and 14.

Figure 13:
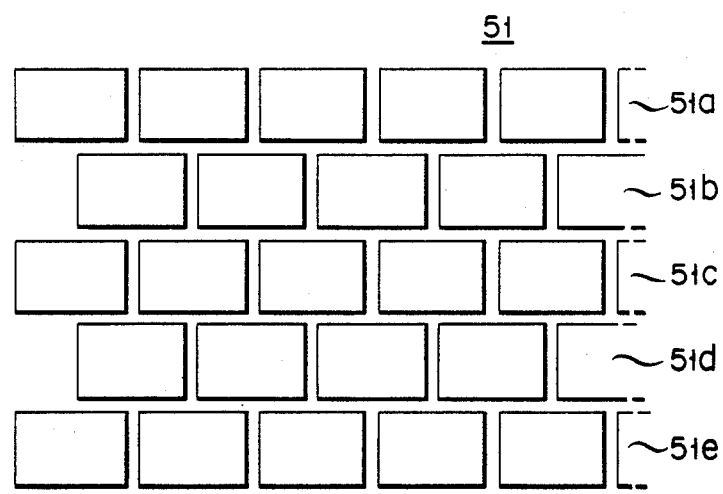
FIG. 13 shows another arrangement of photosensors of a CCD device used in the camera according to the present invention.

In the color filter array, the picture elements 51a to 51b in the first and second rows are horizontally shifted by ½ width of the picture element, as shown in FIG. 13. The picture elements 51c, 51d and 51e in the third and subsequent rows are horizontally dislocated by the half width of the picture element in the progressive order. Thus, the picture elements on the photosensitive surface of the CCD device 51 are arrayed and shifted successively by the half width of the picture element in the adjacent picture element rows. The picture element arrayed in FIG. 13 are only a part of whole picture element of the photosensitive surface. The total number of picture elements arrayed in a matrix on the photosensitive surface of the solid-state image pick-up device 51 according to the picture element array is 492×380.

Figure 14:
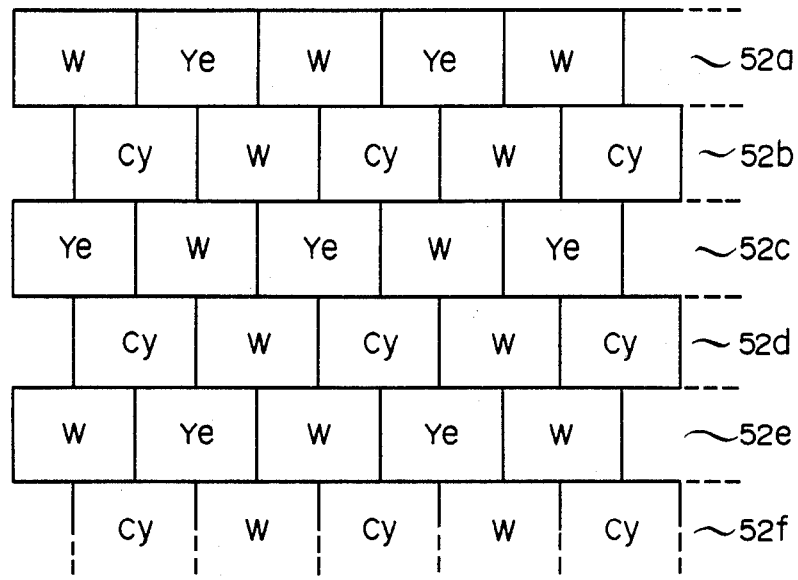
FIG. 14 shows an arrangement of a color filter array used with the photosensor array of FIG. 13.

The color filter blocks in a color filter array 52 corresponding to the picture element array are as shown in FIG. 14. The first color filter row 52a includes the transparent filter blocks W and the yellow filter blocks Ye alternately arranged in line. The second and fourth color filter rows 52b and 52d each include the cyan filters and the transparent filters W alternately arranged horizontally in progressive order. The third color filter row 52c includes the yellow filter Ye and the transparent filters horizontally arranged in an alternately manner. In the color filter array, these four color filter rows 52a to 52d are combined together into a functional block. The color filter blocks arranged in a line in the color filter array are shifted the half width of the picture element every color filter row, corresponding to the photosensor array of FIG. 3.

Figure 15:
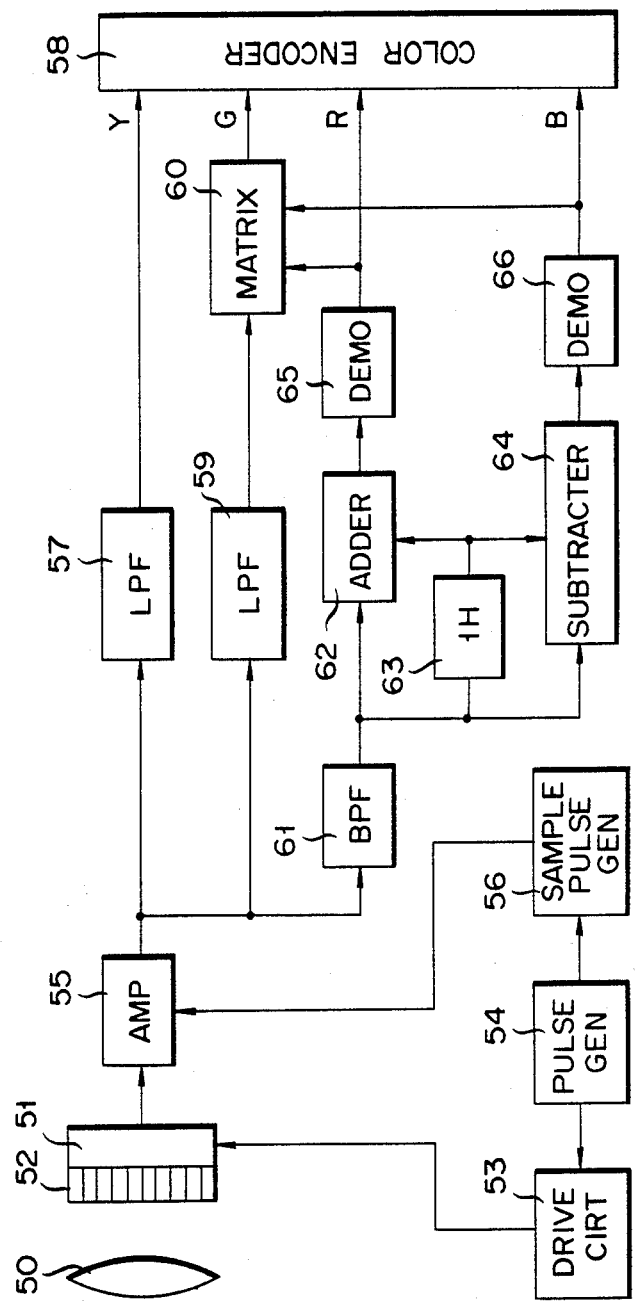

The CCD element 51 for receiving the optical image modulated by the color filter array 52 is driven by a given pulse signal applied from a drive circuit 53 shown in FIG. 15. The CCD device 51, when driven, reads out the picked up signal and produces corresponding signals. The CCD device 51 is so designed as to simultaneously read out two picture element rows continuous in the vertical scanning direction.

Figure 16:
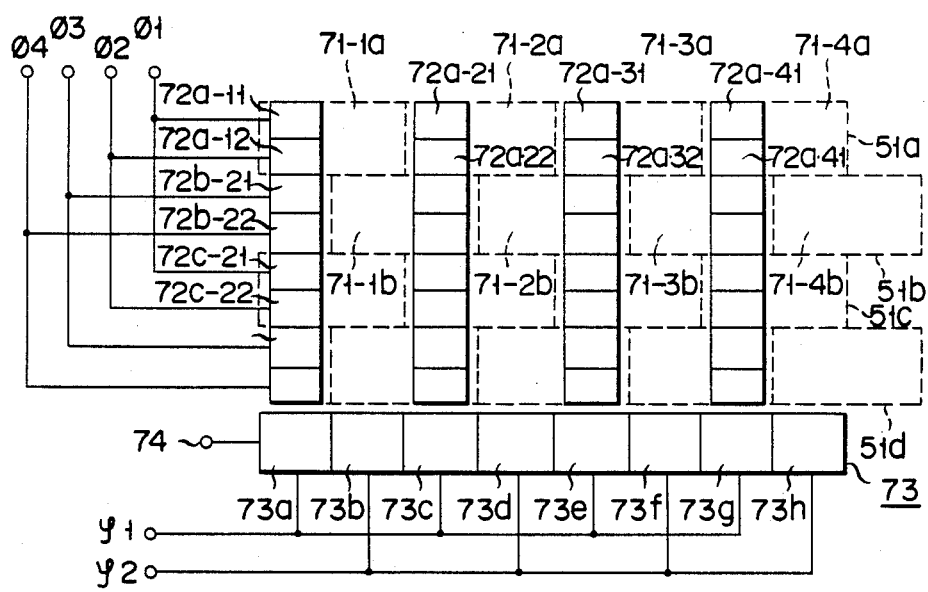
FIGS. 15 to 17 show block diagrams of another embodiment of a solid-state color television camera according to the present invention.
Figure 17:
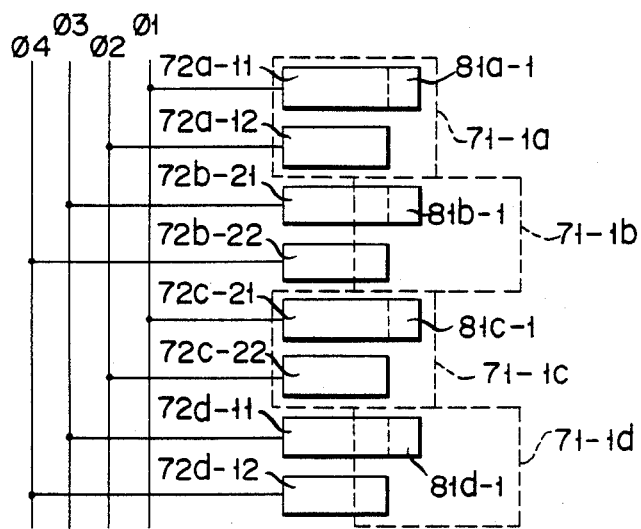

The two-line concurrent-mixing read-out method will be described referring to FIG. 16. In the explanation to follow, the CCD device 51 is an interline transfer CCD of the 4-phase drive type. FIG. 16 shows a schematic circuit diagram of the interline transfer type CCD 51. FIG. 17 is an enlarged view of a part of the CCD 51 in FIG. 16. The photosensors generally designated by 71, which are formed by photodiodes, are located at the positions corresponding to the filter blocks 51a-1, 51a-2, ... in the color filter array 52 shown in FIG. 14. Transfer electrodes for the CCD 72a-11, 72a-12, 72a-21, 72a-22, ... for transferring charges between the two electrodes in the vertical scanning direction are disposed adjacent to the photosensors 71-1a, 71-2a, ... in the picture element row 51a. The transfer electrodes generally designated by 72 are connected together every four electrodes. For example, electrodes 72a-11 and 72c-21 are connected together in this embodiment. As shown, four phase drive pulses $\phi 1$ to $\phi 4$ are applied to the electrodes, respectively. The transfer electrodes 72 supplied with the drive pulses $\phi 1$ and $\phi 3$ are integrally provided with gates 81a-1, 81b-1, ... for fetching the signal charge stored in the photosensors 71-1a, 71-2a, ..., respectively. The signal charge stored in the photosensors 71-1a, 71-1b, ... are transferred every one horizontal scanning line to a line transfer section 73, through the gating operation of the gates 81a-1, 81b-1, ... and the driving of the transfer electrodes 72. In the line transfer section 73, the line transfer electrodes are connected together every two electrodes such as 73a, 73c, 73e, and 73g. The two adjacent electrodes are supplied with drive pulses $\phi 1$ and $\phi 2$, as shown. Upon receipt of the two phase drive pulses, the line transfer section 72 allows the signal charge transferred from the transfer section 72 to go to a video signal output terminal 74 and to exterior.

Figure 18A:
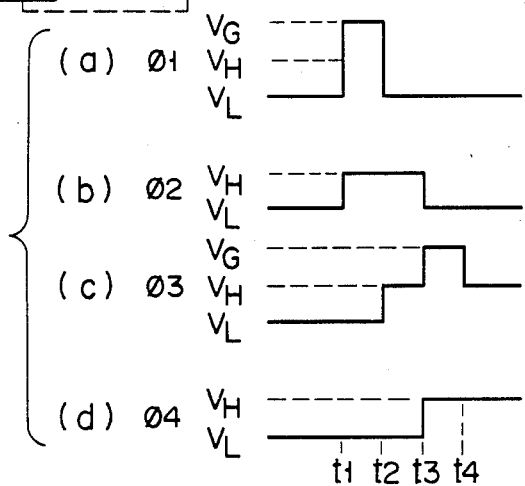
Figure 18B:
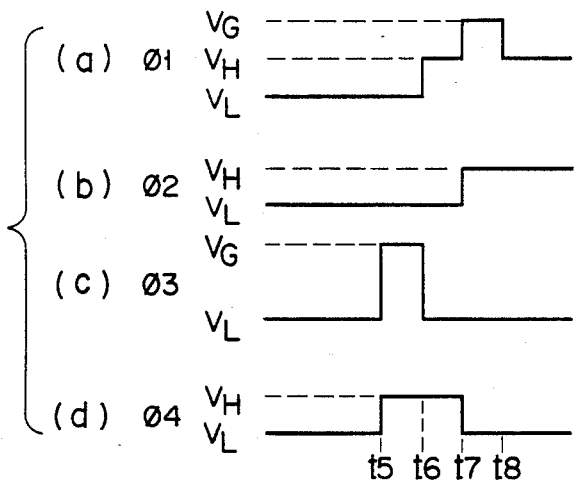

A specific example how to perform the two line concurrent mixing read out will be described. FIGS. 18A and 18B show waveforms of the drive pulses applied to the transfer section 72. The drive pulse has three voltage states VL, VH, and VG. The voltage VG of the drive pulses $\phi 1$ and $\phi 3$ are applied to the electrodes 72a-11, 72b-21, and the like for enabling the gates 81a-1, 81b-1, ... When the voltage applied to the transfer electrode exceeds the voltage VH, for example, +1 V, or more, a potential well is formed under the electrode. The signal charge fetched from the photosensors 71-a, 71-*b*, . . . are stored in the potential well formed. When the voltage is VL, for example, −6 V, a potential well is not formed under the electrode and the storage of the charge is not performed. In a stationary state, the potential well is formed under the two adjacent electrodes. Under these conditions, the two-line concurrent-mixing read out is performed in the following manner.

(i) During a period of time t1 to t2, the voltage of the drive pulse $\phi1$ is VG, the voltage of the drive pulse $\phi2$ is VH, and the voltage of the drive pulses $\phi3$ and $\phi4$ is VL. The gates 81*a*-1 and 81*c*-1 are enabled. The signal charge in the photosensors 71-*a* and 71-*c* are transferred to the potential well under the electrodes to which the drive pulses $\phi1$ and $\phi2$ are applied.

(ii) During the period of time t2 to t3, the drive pulse $\phi1$ is VL and the gates 81-1 and 81-3 are disabled. The drive pulses $\phi2$ and $\phi3$ are VH. Accordingly, the signal charge under the electrodes to which the drive pulses $\phi1$ and $\phi2$ are applied are transferred to the well under the electrodes with the drive pulses $\phi2$ and $\phi3$.

(iii) During the period of time t3 to t4, the drive pulse $\phi3$ is VG, the drive pulse $\phi4$ is VH and the drive pulse $\phi2$ is VL. The signal charge under the electrodes having the drive pulses $\phi2$ and $\phi3$ are transferred to the well under the electrodes supplied with the drive pulses $\phi3$ and $\phi4$. At the same time, the signal charge in the photosensors 71-1*b* and 71-1*d* are transferred to the well under the electrodes having the drive pulses $\phi3$ and $\phi4$. As a result, the signal charge from the photosensor 71-1*a* and the signal charge from the photosensor 71-1*b* are added together through the mixing. The signal charge from the photosensor 71-1*c* and the signal charge from the photosensor 71-1*d* are likewise added together through the mixing.

(iv) After time t4, the drive pulses $\phi1$ and $\phi2$ are VL, and the drive pulses $\phi3$ and $\phi4$ are VH. The gates 81*b*-1 and 81*d*-1 are OFF. The signal charge is stored under the electrodes supplied with the drive pulses $\phi3$ and $\phi4$.

Following the two line concurrent mixing read out thus performed, no gating of the gates 81*a*-1, 81*b*-1, . . . is performed. The vertical transfer of the signal charge is performed by the potential well and the mixed signal charge is transferred to the line transfer section 73.

The two-line concurrent-mixing read out will be described using the color filter array 52 shown in FIG. 14. The first horizontal scanning provides a signal representing the addition of the first color filter row 52*a* and the second color filter row 52*b*. The second horizontal scanning produces a signal representative of the addition of the third color filter row 52*c* and the fourth color filter row 52*d*.

Then, the third horizontal scanning provides a signal representing the addition of the 5th color filter row 52*e* and the 6th color filter row 52*f*. In this way, the subsequent horizontal scannings are excuted to produce corresponding signals representing the additions of the corresponding color filter rows. More specifically, the signal produced by the first horizontal scanning includes colors of Cy+W and Ye+W alternately arranged in progressive order. The signal produced by the second horizontal scanning includes colors of Cy+Ye and W+W (=2W) alternately arranged in successive order. The signal produced by the third horizontal scanning is the same as that by the first horizontal scanning. The signal by the fourth horizontal scanning is the same as that by the second horizontal scanning. Subsequently, the formats of the signals by the first and second horizontal scannings are repeated progressively.

Generally, interlaced scanning is used in the television system. In the present case, in the even fields the first even-numbered scanning line provides a signal representing the addition of the second color filter row 52*b* and the third color filter row 52*c*. The second even-numbered scanning line provides a signal representing the addition of the fourth color filter row 52*d* and the fifth color filter row 52*e*. Thus, the combinations of the color filter rows, which constitute the signals produced by the scanning lines, are different from those in the odd field. With the specific arrangement of the color filter array 52, the addition signal of the second color filter row 52*b* and the third color filter row 52*c* is the same as that of the addition signal of the first and second color filter rows. Therefore, the odd fields can produce the same color signals as those produced from the odd fields shown in FIG. 14.

The two-line concurrent-mixing read-out mode in the even fields will be described referring to FIG. 18B.

(i) During the period of time t5 to t6, the drive pulses $\phi1$ and $\phi2$ is VL, the drive pulse $\phi3$ is VG, and the drive pulse $\phi4$ is VH. The gates 81*b*-1 and 81*d*-1 are enabled and the signal charge from the photosensors are transferred to the potential well under the electrodes applied with the drive pulses $\phi3$ and $\phi4$.

(ii) During the period of time t6 to t7, the drive pulses $\phi4$ and $\phi1$ are VH, the gates 81*b*-1 and 81*d*-1 are OFF. The signal charge from the electrodes supplied with the drive pulses $\phi3$ and $\phi4$ are transferred to the well under the electrodes supplied with the drive pulses $\phi4$ and $\phi1$.

(iii) During the period of time t7 to t8, the drive pulse $\phi2$ is VH and the drive pulse $\phi1$ is VG. The gate 81*c*-1 is ON. The signal charge under the photosentor 71-1*c* is transferred to the well under the electrodes supplied with the drive pulses $\phi1$ and $\phi2$ where the charges are added to the previous charge from the photosensor 71-1*b*. At the same time, the drive pulse $\phi4$ is VL, so that the charge is transferred to the well under the electrodes supplied with the drive pulses $\phi1$ and $\phi2$.

(iv) After time t8, the drive pulses $\phi1$ and $\phi2$ are VH and the drive pulses $\phi3$ and $\phi4$ are VL. The signal charges are transferred to the well under the electrodes supplied with the drive pulses $\phi1$ and $\phi2$.

As seen from the foregoing description, the even field is switched to the odd field by changing the order of the drive pulses $\phi1$, $\phi2$, $\phi3$ and $\phi4$ to another order of $\phi3$, $\phi4$, $\phi1$ and $\phi2$. For changing the order of the drive pulses, in FIG. 15, the pulse generator circuit 54 produces a field index pulse (generally it is generated by a camera sync signal generating IC), for example, at the first odd field (at the end of the even field). The field index pulse is used for changing the clock pulse order.

The output signal thus obtained from the CCD device is amplified by an amplifier 55 up to a given signal level. The amplifier 55 may be a circuit having a sample/hold function which is gated by the output signal from the sample pulse generator 56 and amplifies the signal applied. The output signal from the amplifier 55 is applied to a first LPF 57 with a 3 MHz frequency band for removing modulated component. The first LPF 57 converts it into a luminance signal Y and applies it to a color encoder 58. The output signal from the amplifier 55 is partially applied to a second LPF 59 with a 0.5 MHz band width. The second LPF converts it into a low frequency color signal and it is applied to a second subtractor circuit 60. The output signal from the amplifier 55 is partially applied to an adder circuit 63 through a BPF 61 with a frequency band from 3 MHz to 4 MHz. The output signal from the 1H delay circuit 63 is applied to adder circuits 62 and 64.

Figures 19A, 19B, 20A, 20B, 20C, 20D:
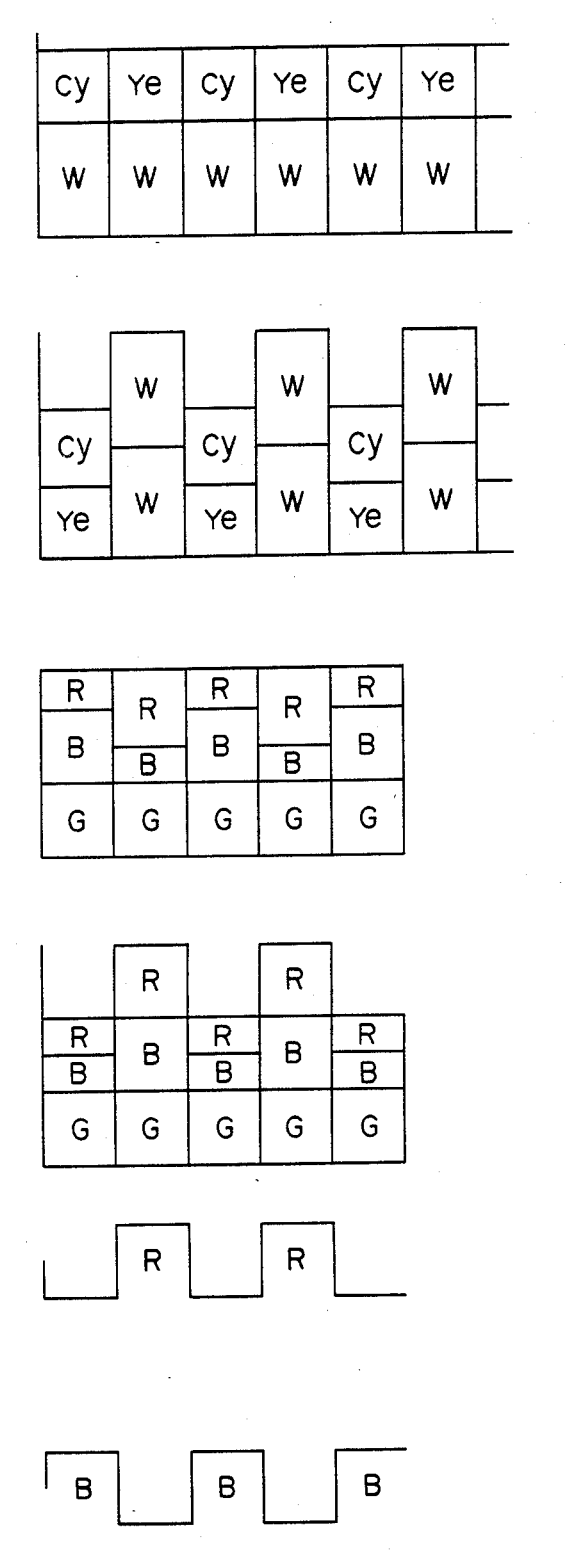

The output signal from the amplifier 55 is converted into a point-sequential color signal as shown in FIG. 19A or 19B. Actually, the signal obtained from the amplifier has been modulated according to a shade of an object under pickup of every picture element, that is, a pulse modulated signal. Since $Cy=G+B$ and $Ye=R+G$, the addition signal of the first and second color filter rows includes color signals $R+2G+2B$ and $2R+2G+B$ alternately arranged in a line, as shown in FIG. 20A. The addition signal of the third and fourth color filter rows includes color signals $R+2G+B$ and $2R+2G+2B$ alternately arranged successively. Accordingly, the output signal from the LPF 59 includes only the low frequency component of the pulse modulated signal, i.e. $3R/2+2G+3B/2$. The output signal from the subtractor 64 for the modulated signal component contains only the B signal, as shown in FIG. 20D, resulting in the B color. Similarly, the output signal from the adder circuit 62 contains only the R signal as shown in FIG. 20C, resulting in the R signal. These modulated signals are produced every two picture elements. Therefore, the carrier signal thereof is 3.58 MHz and the signals are those amplitude-modulated with the side band frequencies. Accordingly, these signals are demodulated by the first and second demodulating circuits 65 and 66 and are separated into a red signal R and a blue signal B.

The signal passed through the LPF 59 contains the red component R and the blue component B. When these signals are applied to the second subtractor circuit 60, the signal components are removed to provide a green signal. The luminance signals Y thus obtained and signals G, R and B are applied to a color encoder 58, which in turn produces an NTSC signal as a standard television signal. It is evident that the present embodiment can provide the effects equivalent to those by the previously stated embodiment.

The present embodiment adds the signals of two picture elements in the vertical direction. If an arrangement of the color filter blocks in the color filter is slightly shifted from that of the picture elements in the CCD device, the reproduced picture is stable and free from flicker.

Actually, it is almost impossible to accurately coincide these arrangements. A tentative measure taken for this is to cover the photodiodes in the photosensors with a black mask for shielding purposes. The present invention eliminates the need of such mask. In this repect, the present invention provides a high sensitivity color camera.

It should be understood that the color filter 52 shown in FIG. 14 may variously be modified. A modification of the color filter array shown in FIG. 21, which is denoted as 52A, has a slightly reduced DC component of the blue signal. In this color filter array 52A, the first color filter row includes yellow color filters Ye and the cyan filters Cy alternately arranged in succession. The second and fourth color filter rows include yellow filters Ye and the transparent filters W alternately and progressively arranged. The third color filter row includes transparent filters W and the green filters G arranged alternately and successively. FIG. 22 shows another modification of the color filter array, which is denoted as 52B. In the color filter array 52B, the first color filter row includes an alternate arrangement of the transparent filters W and the cyan filters Cy. The second and fourth color filter arrays includes an alternate arrangement of the yellow filters Ye and the transparent filters W. The third color filter row includes an alternate arrangement of the cyan filters Cy and the transparent filters W. When this color filter array 52B is applied to the color television camera shown in FIG. 15, the color signals from the demodulators 65 and 66 are blue and red signals, respectively. This output state is inverse to that when the color filter array 52A is used.

The selection of these color filter arrays as mentioned above depends on spectral sensitivity characteristics of the solid-state image pick device 51, ease of manufacturing the color filter array, S/N of color signals, etc.

While the picture elements and the color filter blocks are shifted by the phase $\pi$, $\pi/3$ and $2\pi/3$ (FIG. 23) every row, the amount of the phase shift may properly be selected.

The interline transfer type CCD for the solid-state image pickup device may be substituted by a so-called dual-stage solid-state image pickup device.

What is claimed is:

1. A solid-state color television camera comprising:
an image pickup device;
a color filter array placed in front of said solid-state image pickup device;
a color separation circuit for extracting three primary colors, red, green and blue, from a multiplex signal derived from said image pickup device;
said filter array including a plurality of color filter rows arranged extending in the horizontal scanning direction, each of said color filter rows having color filter blocks with different color transmission characteristics alternately arranged, in which a first color filter row selected from said plurality of color filter rows is made up of first and second color filter blocks with first and second color transmission characteristics, said first color filter row is disposed adjacent to a second color filter row made up of and alternately arranged third and fourth filter blocks respectively having a third color transmission characteristic and a given transmission characteristic, and said first and second color filter blocks of said first color filter row are disposed and shifted a given length in the horizontal scanning direction, with respect to said third and fourth color filter blocks of said second color filter row; and
said solid-state image pickup device having a plurality of photosensors disposed corresponding to said color filter blocks of said color filter array.

2. A solid-state color television camera according to claim 1, in which first and second color components as specified color components in the transmitted color light rays obtained from said first color filter row have the same phases and periods; and said second color filter row produces first and second color components with the same periods but different phases.

3. A solid-state color television camera according to claim 1, in which said first color filter row includes a transparent filter block and a green filter block, and said second color filter row includes a yellow filter block, a cyan filter block, said first color component is red, and said second color component is blue.

4. A solid-state color television camera according to claim 1, in which said first color filter row includes a transparent filter block and a red filter block, said second color filter row includes a magenta filter block and a yellow filter block, said first color component is blue, and said second color component is green.

5. A solid-state color television camera according to claim 1, in which said first color filter row includes a transparent filter block and a blue filter block, and said second color filter row includes a magenta filter block and a cyan filter block, said first color component is red, and said second color component is green.

6. A solid-state color television camera according to claim 1, in which said multiplex color signal separating means includes means for obtaining a color signal at high frequency from said multiplex color signal, means for delaying said high frequency color signal by one horizontal scanning period and a phase of $\pi$, and means for obtaining two specific color signals of red, blue and green color signals from said high frequency color signal and the color signal obtained by delaying said high frequency color signal.

7. A solid-state color television camera according to claim 1, in which said multiplex color signal separating means includes means for forming a color signal at high frequency from said multiplex color signal, means for delaying said high frequency color signal by one horizontal scanning period, means for delaying said high frequency color signal by $\pi$, and means for obtaining two specific color signals of red, blue and green color signals from said high frequency color signal and the color signal obtained by delaying said high frequency color signal.

8. A solid-state color television camera according to claim 1, in which, in said color filter array, first to fourth color filter rows continuously arranged make up a functional unit, said first and second color filter rows are provided corresponding to the nth horizontal read out, said third and fourth color filter rows are provided corresponding to the (n+1)th horizontal read out, said color blocks forming said first to fourth color filter rows are disposed by phase $\pi$ one filter block to another, said first color filter row having an arrangement of color filters permitting transmission of a first color light and color filters permitting transmission of a second color light alternately arranged, said second and fourth color filter rows having arrangement of color filters permitting transmission of a third color light and color filters permitting transmission of a fourth color light alternately arranged, said third color filter row having an arrangement of color filters permitting transmission of a fifth color light and color filters permitting transmission of a sixth color light alternately arranged;

said image pickup device includes means for mixing and reading out the charges stored in said first and second color filter rows at the time of the nth horizontal scanning for mixing and reading out the charges stored in said third and fourth color filter rows at the time of the (n+1)th horizontal scanning, and for producing multiplex signals as horizontal scanning signals.

9. A solid-state color television camera according to claim 8, in which said first and third color filter rows are each comprised of transparent filter blocks and yellow filter blocks, and said second and fourth filter rows are each comprised of filter blocks and yellow filter blocks, and said second and fourth filter rows are each comprised of transparent filter blocks and cyan filter blocks.

10. A solid-state color television camera according to claim 8, in which said first color filter row is comprised of yellow and cyan filter blocks, said second and fourth color filter rows are each comprised of yellow and transparent filter blocks, and said third color filter row is comprised of green and transparent filter blocks.

* * * * *